US006703788B1

(12) United States Patent
Miller et al.

(10) Patent No.: US 6,703,788 B1
(45) Date of Patent: Mar. 9, 2004

(54) WIRELESS LIGHTING SYSTEM

(76) Inventors: John F. Miller, 541 David Ave., Sheboygan Falls, WI (US) 53085; Idell M. Miller, 541 David Ave., Sheboygan Falls, WI (US) 53085

(*) Notice: Subject to any disclaimer, the term of this patent is extended or adjusted under 35 U.S.C. 154(b) by 5 days.

(21) Appl. No.: 10/195,075

(22) Filed: Jul. 12, 2002

(51) Int. Cl.[7] ......................... H05B 37/02; F21V 33/00; G08C 19/04; G01T 1/18

(52) U.S. Cl. ................... 315/155; 315/149; 315/185 S; 315/312; 362/806; 340/870.11; 250/374

(58) Field of Search ................................ 315/155, 149, 315/150–159, 185 S, 200 A, 312, 324; 362/801, 802, 803, 806, 4, 812; 340/870.11, 870.15, 307; 250/374, 366, 367, 336.1

(56) References Cited

U.S. PATENT DOCUMENTS

| | | | | |
|---|---|---|---|---|
| D302,544 S | | 8/1989 | Spira | D13/32 |
| 5,248,919 A | | 9/1993 | Hanna et al. | 315/291 |
| 5,399,940 A | | 3/1995 | Hanna et al. | 315/129 |
| 5,909,087 A | | 6/1999 | Bryde et al. | 315/149 |
| 6,114,812 A | | 9/2000 | Lee | 315/158 |
| 6,169,377 B1 | | 1/2001 | Bryde et al. | 315/294 |
| 6,392,559 B1 | * | 5/2002 | Sharpe, Jr. | 340/825.72 |
| 6,443,604 B1 | * | 9/2002 | Rudenberg | 362/488 |
| 6,446,761 B1 | * | 9/2002 | Motoyama et al. | 187/391 |
| 6,491,516 B1 | * | 12/2002 | Tal et al. | 431/253 |
| 2002/0074898 A1 | * | 6/2002 | Maue et al. | 310/311 |

* cited by examiner

*Primary Examiner*—Tuyet T. Vo

(57) ABSTRACT

A wireless lighting system for providing convenient illumination where needed with centralized control. The wireless lighting system includes a main transmitter assembly providing a centralized control capability; including a housing defining an interior space and a transmitter member positioned substantially within the housing for generating and transmitting control signals, and a plurality of lamp assemblies each having a base portion and a lamp member. Each lamp member selectively provides illumination. Each one of the base portions has a base housing defining an interior space and an energy storage member positioned within said housing for selectively providing electrical current to an associated lamp member. Additionally, each one of said base portions includes a receiver portion positioned within the housing for receiving control signals generated and transmitted by the transmitter member.

19 Claims, 4 Drawing Sheets

WIRELESS LIGHTING SYSTEM

BACKGROUND OF THE INVENTION

1. Field of the Invention

The present invention relates to battery powered lights and more particularly pertains to a new wireless lighting system for providing convenient illumination where needed with centralized control.

2. Description of the Prior Art

The use of remotely controlled lights is known in the prior art. U.S. Pat. Nos. 6,114,812 and 6,169,377 both describe remote control systems for incandescent lighting systems, which are coupled to conventional household power systems While these devices fulfill their respective, particular objectives and requirements, the need remains for a system that is superior in that it allows multiple lamps to each be positioned independently, without the need for wiring.

SUMMARY OF THE INVENTION

The present invention meets the needs presented above by providing a plurality of illumination sources each with a receiver for receiving a centralized control signal from a common transmitter. Additionally each of these illumination sources is powered, at least in part from electricity stored in an energy storage means.

To this end, the present invention generally comprises a main transmitter assembly providing a centralized control capability; including a housing defining an interior space and a transmitter member positioned substantially within the housing for generating and transmitting control signals, and a plurality of lamp assemblies each having a base portion and a lamp member. Each lamp member selectively provides illumination. Each one of the base portions has a base housing defining an interior space and an energy storage member positioned within said housing for selectively providing electrical current to an associated lamp member. Additionally, each one of said base portions includes a receiver portion positioned within the housing for receiving control signals generated and transmitted by the transmitter member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
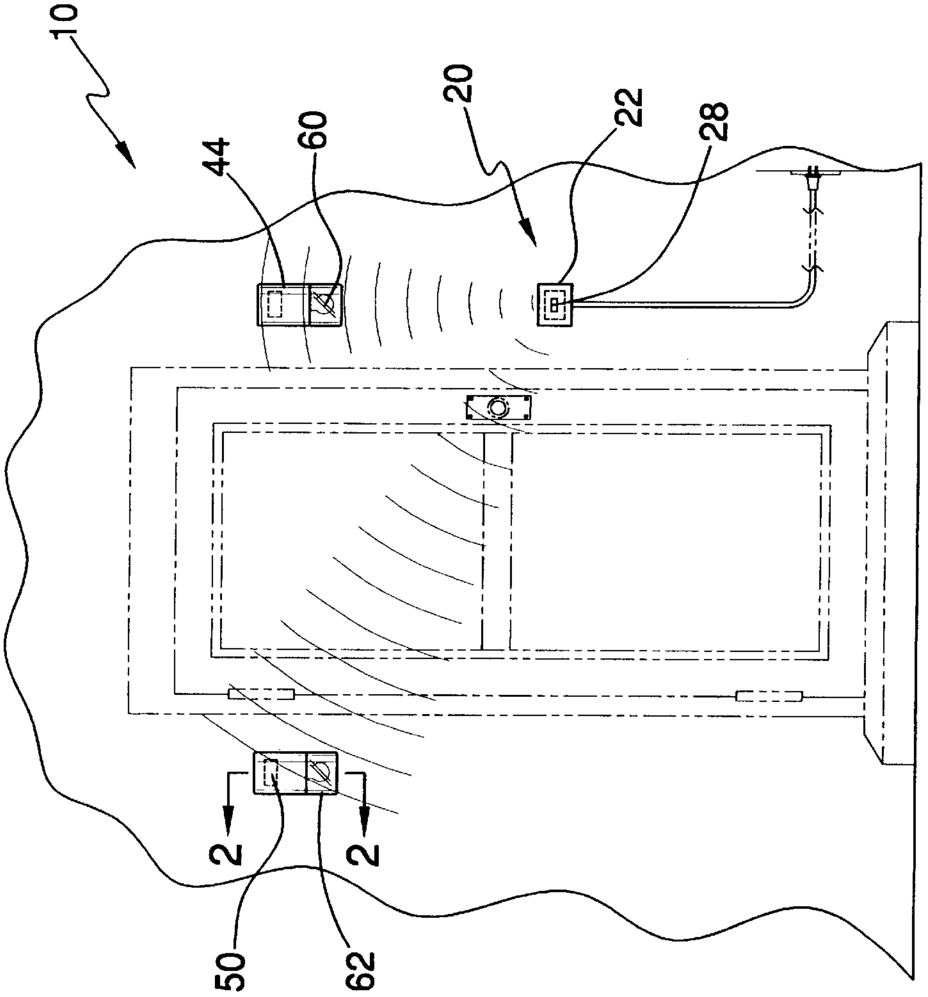
FIG. 1 is a schematic front view of a new wireless lighting system in use according to the present invention.
Figure 2:
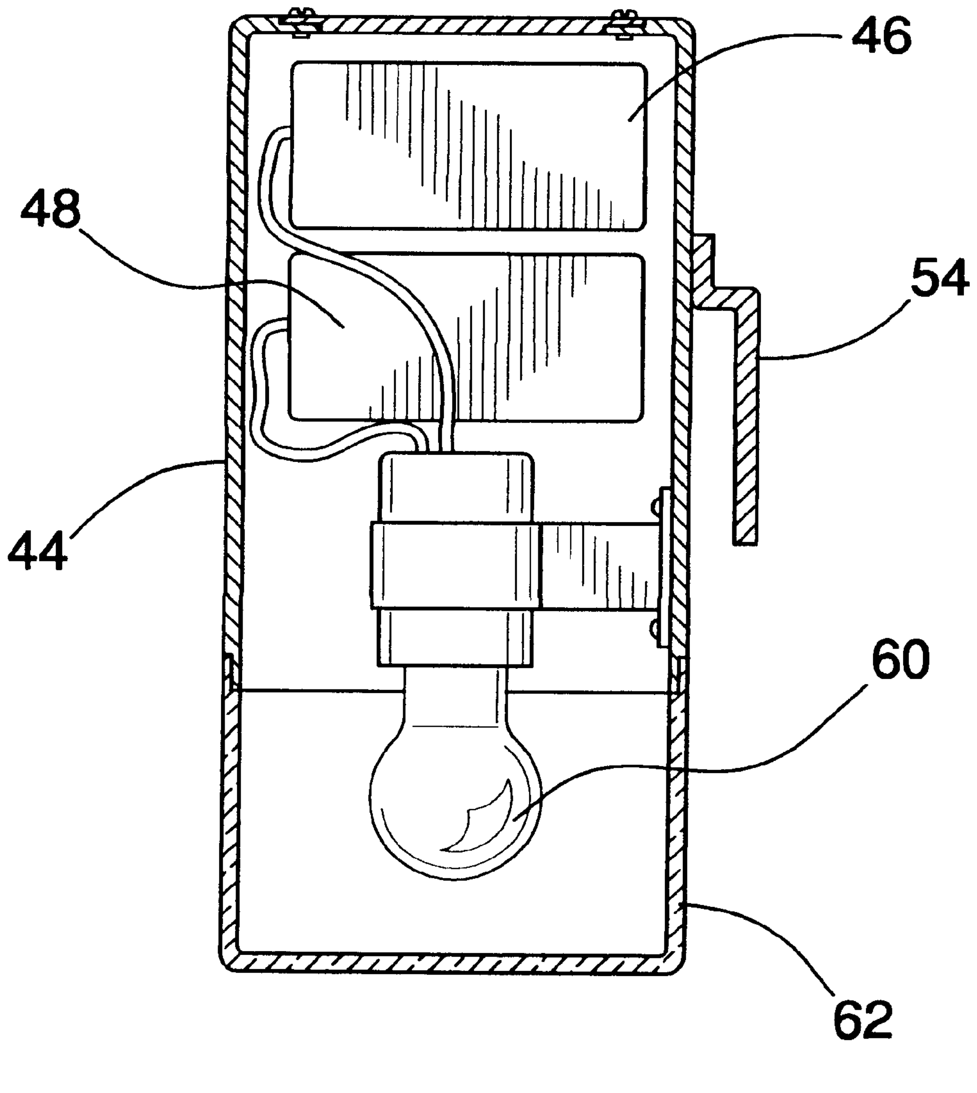
FIG. 2 is a schematic cross-sectional view of the present invention.
Figure 3:
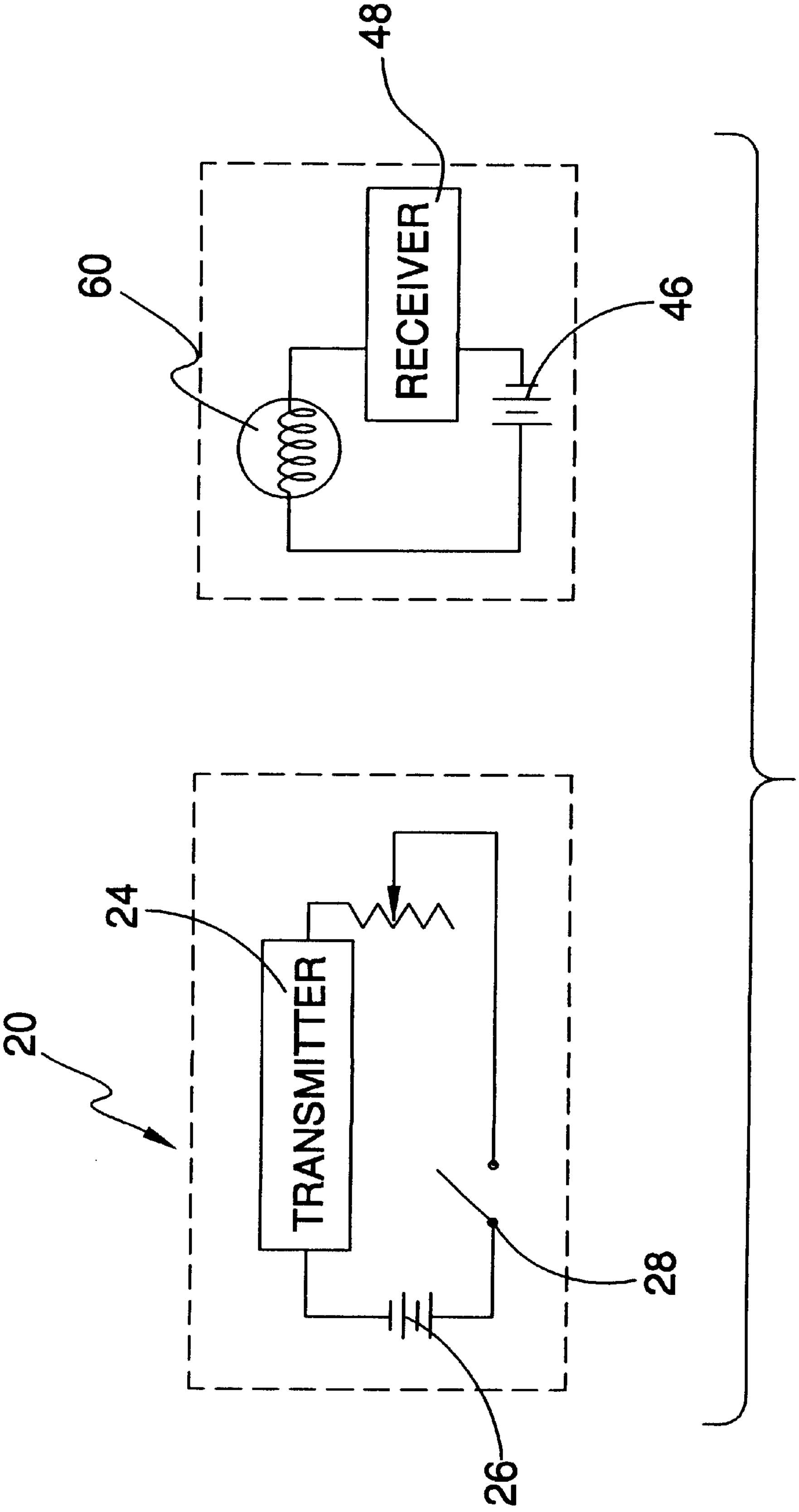
FIG. 3 is a schematic functional interconnection diagram of the present invention.
Figure 4:
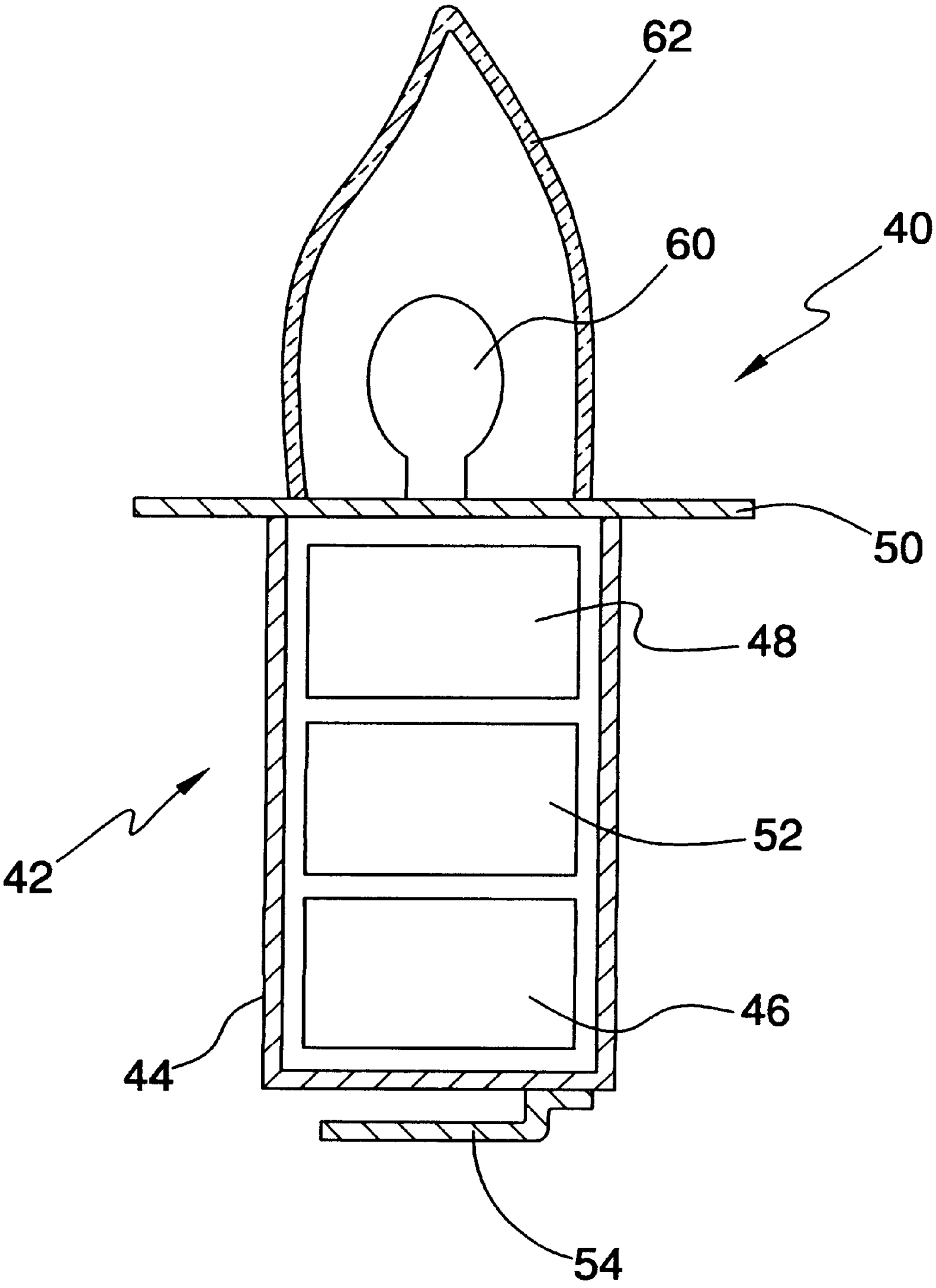
FIG. 4 is a schematic cross-sectional view of an embodiment of the present invention.

With reference now to the drawings, and in particular to FIGS. 1 through 4 thereof, a new wireless lighting system embodying the principles and concepts of the present invention and generally designated by the reference numeral 10 will be described.

As best illustrated in FIGS. 1 through 4, the wireless lighting system 10 generally comprises a main transmitter assembly 20 and a plurality of lamp assemblies 40.

The main transmitter assembly 20 provides a centralized control capability. The main transmitter assembly 20 includes a housing 22 defining an interior space, and a transmitter member 24 positioned substantially within the housing 22. The transmitter member 24 is for generating and transmitting control signals.

Each one of the plurality of lamp assemblies 40 includes a base portion 42 and a lamp member 60. Each lamp member 60 selectively provides illumination. Each one of the base portion 42*s* includes a base housing 44 defining an interior space and an energy storage member 46 positioned within the housing 22 for selectively providing electrical current to an associated lamp member 60. Each one of the base portions 42 also includes a receiver portion 48 positioned within the housing 22 for receiving control signals generated and transmitted by the transmitter member 24.

Each one of the plurality of lamp assemblies 40 may also include a solar cell assembly 50 operationally coupled to the housing 22 and operationally coupled to the energy storage member 46 for providing a supplemental charge to the energy storage member 46.

In a preferred embodiment, each one of the base portions 42 further comprises a secondary transmitter 52 for performing a repromulgation relay function such that a control signal received by the receiver portion 48 is communicated to the secondary transmitter 52 for retransmission to other lamp assemblies 40. The secondary transmitter 52 may be positioned substantially within the housing 22.

Each one of the lamp assemblies 40 may also include a coupling means 54 for selectively attaching the lamp assembly to a structure.

In an embodiment the main transmitter assembly 20 includes a on/off switch 28 for selectively generating a control signal to be transmitted. The main transmitter assembly 20 may be coupled to a wall of a structure. The plurality of lamp assemblies 40 may comprise two lamp assemblies 40, each coupled to a wall of a structure.

In another embodiment, the main transmitter assembly 20 includes an energy storage member 26 positioned within the housing 22, which is operationally coupled to the transmitter member 24. The transmitter assembly includes an on/off switch 28 accessible through the housing 22. The transmitter assembly may be portable. The plurality of lamp assemblies 40 may be coupled to a christmas tree. Each one of the plurality of lamp assemblies 40 is independently positionable on the christmas tree.

Dependent upon the environment in which the system is to be used, the coupling means 54 may be selected from the group of coupling members consisting of hook and loop fastener, screws, clip, adhesive, magnet, suction cup, and nail. Other coupling members may also be employed.

In a preferred embodiment, the energy storage member 46 further comprises a battery positioned substantially within the base portion 42.

In still a further embodiment, each one of the lamp members 60 includes a colored lens portion 62 such that each one of the lamp members 60 provides a colored illumination.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A wireless lighting system for use in multiple environments comprising:

a main transmitter assembly providing a centralized control capability, said main transmitter assembly having a housing defining an interior space, said main transmitter assembly having a transmitter member positioned substantially within said housing, said transmitter member being for generating and transmitting control signals;

a plurality of lamp assemblies, each one of said plurality of lamp assemblies having a base portion and a lamp member, each lamp member selectively providing illumination, each one of said base portions having a base housing defining an interior space, each one of said base portions having an energy storage member positioned within said housing, for selectively providing electrical current to an associated lamp member, each one of said base portions having a receiver portion positioned within said housing, said receiver portion being for receiving control signals generated and transmitted by said transmitter member; and wherein each one of said base portions further comprises a secondary transmitter for performing a repromulgation relay function such that a control signal received by said receiver portion is communicated to said secondary transmitter for retransmission to other lamp assemblies, said secondary transmitter being positioned substantially within said housing.

2. The system of claim 1, wherein each one of said plurality of lamp assemblies further comprises a solar cell assembly operationally coupled to said housing, said solar cell assembly being operationally coupled to said energy storage member for providing a supplemental charge to said energy storage member.

3. The system of claim 1, wherein said energy storage member further comprises a battery positioned substantially within said base portion.

4. The system of claim 1, wherein each one of said lamp members having a colored lens portion such that each one of said lamp members provides a colored illumination.

5. The system of claim 1, wherein each one of said lamp assemblies further comprises a coupling means for selectively attaching said lamp assembly to a structure.

6. The system of claim 5, wherein said coupling means comprises a coupling member selected from the group of coupling members consisting of hook and loop fastener, screws, clip, adhesive, magnet, suction cup, and nail.

7. The system of claim 5, wherein said coupling means being positioned along a rear surface of said base portion.

8. The system of claim 5, wherein said coupling means being positioned along a bottom surface of said base portion.

9. A wireless lighting, system for use in multiple environments comprising:

a main transmitter assembly providing a centralized control capability, said main transmitter assembly having a housing defining an interior space, said main transmitter assembly having a transmitter member positioned substantially within said housing, said transmitter member being for generating and transmitting control signals;

a plurality of lamp assemblies, each one of said plurality of lamp assemblies having a base portion and a lamp member, each lamp member selectively providing illumination, each one of said base portions having a base housing defining an interior space, each one of said base portions having an energy storage member positioned within said housing, for selectively providing electrical current to an associated lamp member, each one of said base portions having a receiver portion positioned within said housing, said receiver portion being for receiving control signals generated and transmitted by said transmitter member;

each one of said plurality of lamp assemblies further comprises a solar cell assembly operationally coupled to said housing, said solar cell assembly being operationally coupled to said energy storage member for providing a supplemental charge to said energy storage member;

each one of said base portions further comprises a secondary transmitter for performing a repromulgation relay function such that a control signal received by said receiver portion is communicated to said secondary transmitter for retransmission to other lamp assemblies, said secondary transmitter being positioned substantially within said housing; and each one of said lamp assemblies further comprises a coupling means for selectively attaching said lamp assembly to a structure.

10. The system of claim 9, further comprising:

wherein said main transmitter assembly having a on/off switch for selectively generating a control signal to be transmitted, said main transmitter assembly being coupled to a wall of a structure;

wherein said plurality of lamp assemblies comprises two lamp assemblies, each one of said lamp assemblies being coupled to a wall of a structure.

11. The system of claim 9, further comprising:

wherein said main transmitter assembly having an energy storage member positioned within said housing, said energy storage member being operationally coupled to said secondary transmitter member, said main transmitter assembly having an on/off switch accessible through said housing, said transmitter assembly being portable; and wherein said plurality of lamp assemblies being coupled to a Christmas tree, each one of said plurality of lamp assemblies being independently positionable on the Christmas tree.

12. The system of claim 9, wherein said coupling means comprises a coupling member selected from the group of coupling members consisting of hook and loop fastener, screws, clip, adhesive, magnet, suction cup, and nail.

13. The system of claim 9, wherein said coupling means being positioned along a rear surface of said base portion.

14. The system of claim 9, wherein said coupling means being positioned along a bottom surface of said base portion.

15. The system of claim 9, wherein said energy storage member further comprises a battery positioned substantially within said base portion.

16. The system of claim 9, wherein each one of said lamp members having a colored lens portion such that each one of said lamp members provides a colored illumination.

17. The system of claim 9, wherein said coupling means comprises a coupling member selected from the group of coupling members consisting of hook and loop fastener, screws, clip, adhesive, magnet, suction cup, and nail;

wherein said energy storage member further comprises a battery positioned substantially within said base portion; and wherein each one of said lamp members having a colored lens portion such that each one of said lamp members provides a colored illumination.

18. The system of claim 17, wherein said coupling means being positioned along a rear surface of said base portion.

19. The system of claim 17, wherein said coupling means being positioned along a bottom surface of said base portion.

* * * * *